United States Patent
McDonnell et al.

(10) Patent No.: US 6,813,499 B2
(45) Date of Patent: Nov. 2, 2004

(54) PROVIDING LOCATION DATA ABOUT A MOBILE ENTITY

(75) Inventors: James Thomas Edward McDonnell, Bristol (GB); Andrew Thomas, Los Altos, CA (US); Michael P. Spratt, Bristol (GB); John Deryk Waters, Bath (GB); Simon E. Crouch, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 538 days.

(21) Appl. No.: 09/816,681

(22) Filed: Mar. 23, 2001

(65) Prior Publication Data

US 2001/0055975 A1 Dec. 27, 2001

(30) Foreign Application Priority Data

Mar. 25, 2000 (GB) .............................. 0007251

(51) Int. Cl.⁷ .................................. G01S 3/02
(52) U.S. Cl. ................. 455/456.1; 455/404.2
(58) Field of Search .......................... 455/456.1, 456.2, 455/456.3, 432.6, 440, 512, 408, 134, 404.2, 135; 342/357.01, 357.1, 357.02, 357.06, 357.07, 357.12

(56) References Cited

U.S. PATENT DOCUMENTS

| | | | |
|---|---|---|---|
| 5,375,161 A | 12/1994 | Fuller et al. ................ 379/57 |
| 5,432,842 A | 7/1995 | Kinoshita et al. ............ 379/60 |
| 5,532,690 A | 7/1996 | Hertel ........................ 340/989 |
| 5,561,704 A | 10/1996 | Salimando .................. 379/58 |
| 5,598,166 A | 1/1997 | Ishikawa et al. ........... 342/357 |
| 5,604,765 A | * | 2/1997 | Bruno et al. ................ 375/141 |
| 5,724,660 A | 3/1998 | Kauser et al. .............. 455/456 |
| 5,774,829 A | 6/1998 | Cisneros et al. ............ 701/213 |
| 5,790,074 A | 8/1998 | Rangedahl et al. ......... 342/357 |
| 5,809,424 A | * | 9/1998 | Eizenhoefer ............. 455/456.2 |
| 5,844,522 A | * | 12/1998 | Sheffer et al. .............. 342/457 |
| 5,922,073 A | 7/1999 | Shimada .................... 713/200 |
| 6,067,007 A | 5/2000 | Gioia ........................ 340/426 |
| 6,078,818 A | * | 6/2000 | Kingdon et al. ......... 455/456.5 |
| 6,199,045 B1 | 3/2001 | Giniger et al. ................ 705/1 |
| 6,374,112 B1 | * | 4/2002 | Widegren et al. ........ 455/452.2 |
| 6,385,458 B1 | * | 5/2002 | Papadimitriou et al. . 455/456.2 |
| 6,438,376 B1 | * | 8/2002 | Elliott et al. ................ 455/437 |
| 6,516,190 B1 | * | 2/2003 | Linkola ...................... 455/408 |

FOREIGN PATENT DOCUMENTS

| | | |
|---|---|---|
| CA | 2255349 | 6/1999 |
| EP | 0 703 463 A2 | 3/1996 |
| EP | 0 785 535 A1 | 7/1997 |
| EP | 0 874 529 A2 | 10/1999 |
| EP | 0 973 351 A1 | 1/2000 |
| GB | 2 305 285 | 4/1997 |
| GB | 2 325 592 A | 11/1998 |
| GB | 2 334 859 A | 9/1999 |
| GB | 2339356 A | 1/2000 |
| GB | 2 348 573 A | 10/2000 |
| JP | 10103977 | 4/1998 |
| JP | 11027733 | 1/1999 |
| WO | 94/26567 | 11/1994 |

(List continued on next page.)

OTHER PUBLICATIONS

Abstract of JP 10170625, *Patent Abstracts of Japan*, vol. 1998, No. 11, Sep. 30, 1998.

Primary Examiner—Cong Van Tran

(57) ABSTRACT

A method and device is provided for obscuring the location of a mobile entity to a specified accuracy level. Available location data that has a known accuracy greater than the specified accuracy has its accuracy decreased (85) by combining with the components of the available location data, additional components randomized over a range set by the difference between the known accuracy of the available location data and the specified accuracy level.

10 Claims, 9 Drawing Sheets

FOREIGN PATENT DOCUMENTS

| | | |
|---|---|---|
| WO | 98/08314 | 2/1998 |
| WO | WO 98/25433 | 6/1998 |
| WO | 98/52379 | 11/1998 |
| WO | WO 98/52379 | 11/1998 |
| WO | WO 98/56506 | 12/1998 |
| WO | WO 98/57506 | 12/1998 |
| WO | WO 00/19743 | 4/2000 |
| WO | WO 00/30379 | 5/2000 |

* cited by examiner

PROVIDING LOCATION DATA ABOUT A MOBILE ENTITY

FIELD OF THE INVENTION

The present invention relates to the provision and use of location data concerning mobile entities.

BACKGROUND OF THE INVENTION

Communication infrastructures suitable for mobile users (in particular, though not exclusively, cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

By way of example, FIG. 1 shows one form of known communication infrastructure for mobile users providing both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications ran, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an InterWorking Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

The data connection between the PLMN 10 and the Internet 39 will generally be through a firewall 35 with proxy and/or gateway functionality.

Different data-capable bearer services to those described above may be provided, the described services being simply examples of what is possible.

In FIG. 1, a service system 40 is shown connected to the Internet 40, this service system being accessible to the OS/application 26 running in the mobile entity by use of any of the data-capable bearer services described above. The data-capable bearer services could equally provide access to a service system that is within the domain of the PLMN operator or is connected to another public or private data network.

With regard to the OS/application software 26 running in the data handling subsystem 25 of the mobile entity 20, this could, for example, be a WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. Where the OS/application software is WAP compliant, the firewall will generally also serve as a WAP proxy and gateway. Of course, OS/application 26 can comprise other functionality (for example, an e-mail client) instead of, or additional to, the WAP functionality.

The mobile entity 20 may take many different forms. For example, it could be two separate units such as a mobile phone (providing elements 22–24) and a mobile PC (data-handling system 25) coupled by an appropriate link (wireline, infrared or even short range radio system such as Bluetooth). Alternatively, mobile entity 20 could be a single unit such as a mobile phone with WAP functionality. Of course, if only data transmission/reception is required (and not voice), the phone functionality 24 can be omitted; an example of this is a PDA with built-in GSM data-capable functionality whilst another example is a digital camera (the data-handling subsystem) also with built-in GSM data-capable functionality enabling the upload of digital images from the camera to a storage server.

Whilst the above description has been given with reference to a PLMN based on GSM technology, it will be appreciated that many other cellular radio technologies exist and can typically provide the same type of functionality as described for the GSM PLMN 10.

Recently, must interest has been shown in "location-based", "location-dependent", or "location-aware" services for mobile users, these being services that take account of the current location of the user (or other mobile party). The most basic form of this service is the emergency location service whereby a user in trouble can press a panic button on their mobile phone to send an emergency request-for-assistance message with their location data appended. Another well known location-based service is the provision of traffic and route-guiding information to vehicle drivers based on their current position. A further known service is a "yellow pages" service where a user can find out about amenities (shops, restaurants, theatres, etc.) local to their current location. The term "location-aware services" will be used herein to refer generically to these and similar services where a location dependency exists.

Location-aware services all require user location as an input parameter. A number of methods already exist for determining the location of a mobile user as represented by an associated mobile equipment. Example location-determining methods will now be described with reference to FIGS. 2 to 5. As will be seen, some of these methods result in the user knowing their location thereby enabling them to transmit it to a location-aware service they are interested in receiving, whilst other of the methods result in the user's location becoming known to a network entity from where it can be supplied directly to a location-aware service (generally only with the consent of the user concerned). It is to be understood that additional methods to those illustrated in FIGS. 2 to 5 exist.

As well as location determination, FIGS. 2 to 5 also illustrate how the mobile entity requests a location-aware service provided by service system 40. In the present examples, the request is depicted as being passed over a cellular mobile network (PLMN 10) to the service system 40. The PLMN is, for example, similar to that depicted in FIG. 1 with the service request being made using a data-capable bearer service of the PLMN. The service system 40 may be part of the PLMN itself or connected to it through a data network such as the public Internet. It should, however, be understood that infrastructure other than a cellular network may alternatively be used for making the service request.

The location-determining method illustrated in FIG. 2 uses an inertial positioning system 50 provided in the mobile entity 20A, this system 50 determining the displacement of the mobile entity from an initial reference position. When the mobile entity 20A wishes to invoke a location-aware service, it passes its current position to the corresponding service system 40 along with the service request 51. This approach avoids the need for an infrastructure to provide an external frame of reference; however, cost, size and long-term accuracy concerns currently make such systems unattractive for incorporation into mass-market handheld devices.

FIG. 3 shows two different location-determining methods both involving the use of local, fixed-position, beacons here shown as infra-red beacons IRD though other technologies, such as short-range radio systems (in particular, "Bluetooth" systems) may equally be used. The right hand half of FIG. 3 show a number of independent beacons 55 that continually transmit their individual locations. Mobile entity 20B is arranged to pick up the transmissions from a beacon when sufficiently close, thereby establishing its position to the accuracy of its range of reception. This location data can then be appended to a request 59 made by the mobile entity 20B to a location-aware service available from service system 40. A variation on this arrangement is for the beacons 55 to transmit information which whilst not directly location data, can be used to look up such data (for example, the data may be the Internet home page URL of a store housing the beacon 55 concerned, this home page giving the store location—or at least identity, thereby enabling look-up of location in a directory service).

In the left-hand half of FIG. 3, the IRB beacons 54 are all connected to a network that connects to a location server 57. The beacons 54 transmit a presence signal and when mobile entity 20C is sufficiently close to a beacon to pick up the presence signal, it responds by sending its identity to the beacon. (Thus, in this embodiment, both the beacons 54 and mobile entity 20C can both receive and transmit IR signals whereas beacons 55 only transmit, and mobile entity 20B only receives, IR signals). Upon a beacon 54 receiving a mobile entity's identity, it sends out a message over network 56 to location server 57, this message linking the identity of the mobile entity 20C to the location of the relevant beacon 54. Now when the mobile entity wishes to invoke a location-aware service provided by the service system 40, since it does not know its location it must include it's identity in the service request 58 and rely on the service system 40 to look up the current location of the mobile entity in the location server 57. Because location data is personal and potentially very sensitive, the location server 57 will generally only supply location data to the service system 40 after the latter has produced an authorizing token supplied by the mobile entity 20B in request 58. It will be appreciated that whilst service system 40 is depicted as handling service requests form both types of mobile entity 20B and 20C, separate systems 40 may be provided for each mobile type (this is likewise true in respect of the service systems depicted in FIGS. 4 and 5).

FIG. 4 depicts several forms of GPS location-determining system. On the left-hand side of FIG. 4, a mobile entity 20D is provided with a standard GPS module and is capable of determining the location of entity 20D by picking up signals from satellites 60. The entity 20D can then supply this location when requesting, in request 61, a location-aware service from service system 40.

The right-hand side of FIG. 4 depicts, in relation to mobile entity 20E, two ways in which assistance can be provided to the entity in deriving location from GPS satellites. Firstly, the PLMN 10 can be provided with fixed GPS receivers 62 that each continuously keep track of the satellites 60 visible from the receiver and pass information in messages 63 to local mobile entities 20E as to where to look for these satellites and estimated signal arrival times; this enables the mobile entities 20E to substantially reduce acquisition time for the satellites and increase accuracy of measurement (see "Geolocation Technology Pinpoints Wireless 911 calls within 15 Feet" 1, -Jul.-1999 Lucent Technologies, Bell Labs). Secondly, as an alternative enhancement, the processing load on the mobile entity 20E can be reduced and encoded jitter removed using the services of network entity 64 (in or accessible through PLMN 10).

One the mobile unit 20E has determined its location, it can pass this information in request 65 when invoking a location-aware service provided by service system 40.

FIG. 5 depicts two general approaches to location determination from signals present in a cellular radio infrastructure. First, it can be noted that in general both the mobile entity and the network will know the identity of the cell in which the mobile entity currently resides, this information being provided as part of the normal operation of the system.

(Although in a system such as GSM, the network may only store current location to a resolution of a collection of cells known as a "location area", the actual current cell ID will generally be derivable from monitoring the signals exchanged between the BSC 14 and the mobile entity). Beyond current basic cell ID, it is possible to get a more accurate fix by measuring timing and/or directional parameters between the mobile entity and multiple BTSs 13, these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center—server—of the mobile network).

The left-hand half of FIG. 5 depicts the case of location determination being done in the mobile entity 20F by, for example, making Observed Time Difference (OTD) measurements with respect to signals from BTSs 13 and calculating location using a knowledge of BTS locations. The location data is subsequently appended to a service request 66 sent to service system 40 in respect of a location-aware service. The calculation load on mobile entity 20F could be reduced and the need for the mobile to know BTS locations avoided, by having a network entity do some of the work. The right-hand half of FIG. 5 depicts the case of location determination being done in the network, for example, by making Timing Advance measurements for three BTSs 13 and using these measurements to derive location (this derivation typically being done in a unit associated with BSC 14). The resultant location data is passed to a location server 67 from where it can be made available to authorised services. As for the mobile entity 20C in FIG. 3, when the mobile entity 20G of FIG. 5 wishes to invoke a location-aware service available on service system 50, it sends a request 69 including an authorisation token and its ID (possible embedded in the token) to the service system 40; the service system then uses the authorisation token to obtain the current location of the mobile entity 20G from the location server 67.

In the above examples, where the mobile entity is responsible for determining location, this will generally be done only at the time the location-aware service is being requested. Where location determination is done by the infrastructure, it may be practical for systems covering only a limited number of users (such as the system illustrated in the left-hand half of FIG. 2 where a number of infrared beacons 54 will cover a generally fairly limited) for location-data collection to be done whenever a mobile entity is newly detected by an IRB, this data being passed to location server 57 where it is cached for use when needed. However, for systems covering large areas with potentially a large number of mobile entities, such as the FIG. 5 system, it is more efficient to effect location determination as and when there is a perceived need to do so; thus, location determination may be triggered by the location server 67 in response to the service request 68 from the mobile entity 20G or the mobile entity may, immediately prior to making request 68, directly trigger BSC 14 to effect a location determination and feed the result to location server 67.

Further with respect to the location servers 57, 67, whilst access authorisation by location-aware services has been described as being through authorisation tokens supplied by the mobile entities concerned, other authorisation techniques can be used. In particular, a location-aware service can be prior authorised with the location server in respect of particular mobile entities; in this case, each request from the service for location data needs only to establish that the request comes from a service authorised in respect of the mobile entity for which the location data is requested.

As already indicated, FIGS. 2 to 5 depict only some examples of how location determination can be achieved, there being many other possible combinations of technology used and where in the system the location-determining measurements are made and location is calculated, stored and used. Thus, the location-aware service may reside in the mobile entity whose location is of interest, in a network-connected service system 40 (as illustrated), or even in another mobile entity. Furthermore, whilst in the examples of FIGS. 2 to 5, invocation of the location-aware service has been by the mobile entity whose location is of interest, the nature of the location-aware service maybe such that it is invoked by another party (including, potentially, the PLMN itself). In this case, unless the invoking party already knows the location of the mobile entity and can pass this information to the location-aware service (which may, for example, may be situation where the PLMN invokes the service), it is the location-aware service that is responsible for obtaining the required location data, either by sending a request to the mobile entity itself or by requesting the data from a location server. Unless the location server already has the needed information in cache, the server proceeds to obtain the data either by interrogating the mobile entity or by triggering infrastructure elements to locate the mobile. For example, where a location-aware service running on service system 40 in FIG. 5 needs to find the location of mobile 20G, it could be arranged to do so by requesting this information from location server 67 which in turn requests the location data from the relevant BSC, the latter then making the necessary determination using measurements from BTSs 13. FIG. 6 depicts the various possibilities discussed above.

Although in the foregoing, the provision of location data through the mobile radio infrastructure to the mobile entity has been treated as a service effected over a data-capable bearer channel, it may be expected that as location data becomes considered a basic element of mobile radio infrastructure services, provision will be made in the relevant mobile radio standards for location data to be passed over a signalling channel to the mobile entity.

It is an object to provide a way of restricting the accuracy of the location data provided to a service system.

SUMMARY OF THE INVENTION

According to the present invention, there is provided a method of obscuring the location of a mobile entity to a specified accuracy level, wherein available location data having a known accuracy greater than said specified accuracy has its accuracy decreased by combining with the components of the available location data, additional components randomised over a range set by the difference between the known accuracy of the available location data and the specified accuracy level.

BRIEF DESCRIPTION OF THE DRAWINGS

A method embodying the present invention will now be described, by way of non-limiting example, with reference to the accompanying diagrammatic drawings, in which.

BEST MODE OF CARRYING OUT THE INVENTION

In the following description given with respect to FIGS. 7 to 16, the communication networks that provide intercommunication of the various system elements are not shown for reasons of clarity, these networks simply serving to permit data to be passed between the elements; the forms of the networks are, for example, as described above in relation to FIGS. 1 to 6. Furthermore, the generalisations discussed above in relation to the mobile entity, service system and location server apply equally to these elements as participating in the embodiments of the invention described below. Thus, for example, the service system can be connected to the public Internet 39, to the GPRS network 17 or to another fixed data network interfacing directly or indirectly with the network 17 or network 39. In addition, it should be noted that generally no distinction is made between the mobile entity and its user and references to the identity of the mobile entity should be understood as also applying to the identity of the user of the mobile entity.

Figure 1:
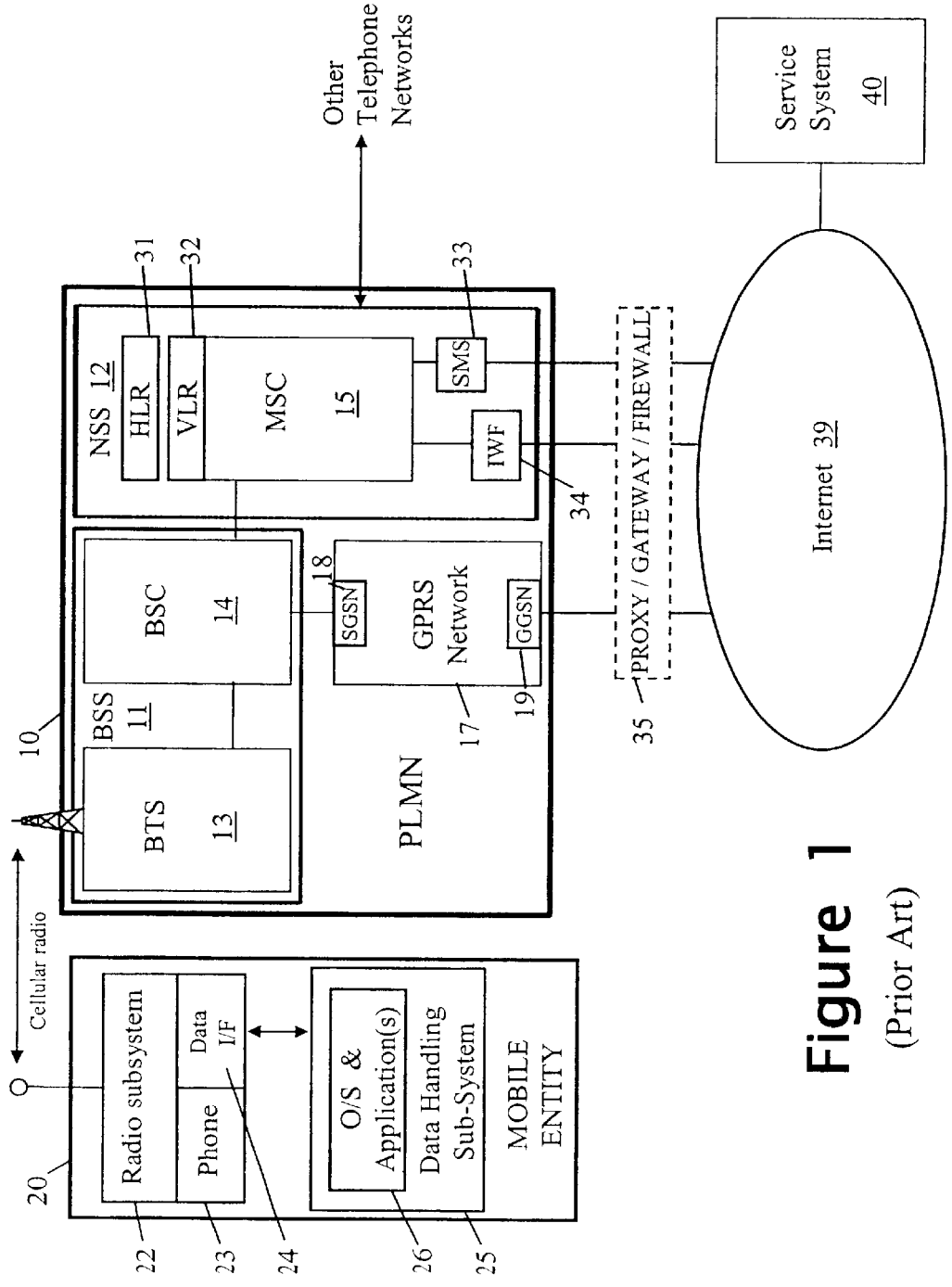
FIG. 1 is a diagram of a known communications infrastructure usable for transferring voice and data to/from a mobile entity.
Figure 2:
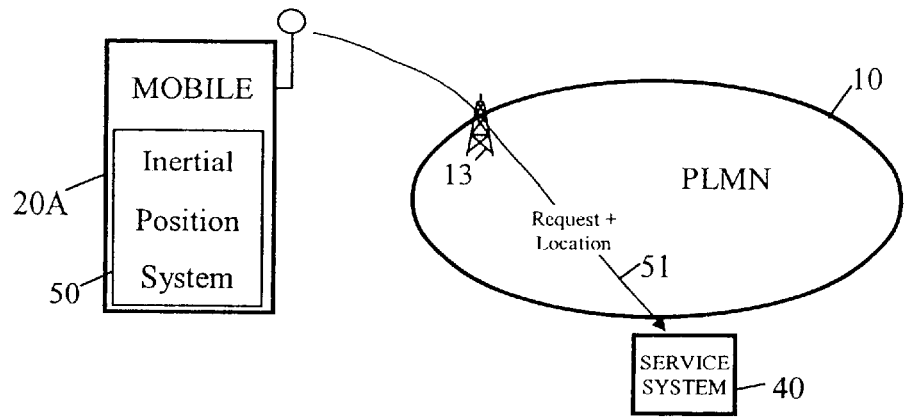
FIG. 2 is a diagram illustrating one known approach to determining the location of a mobile entity, this approach involving providing the entity with an inertial positioning system.
Figure 3:
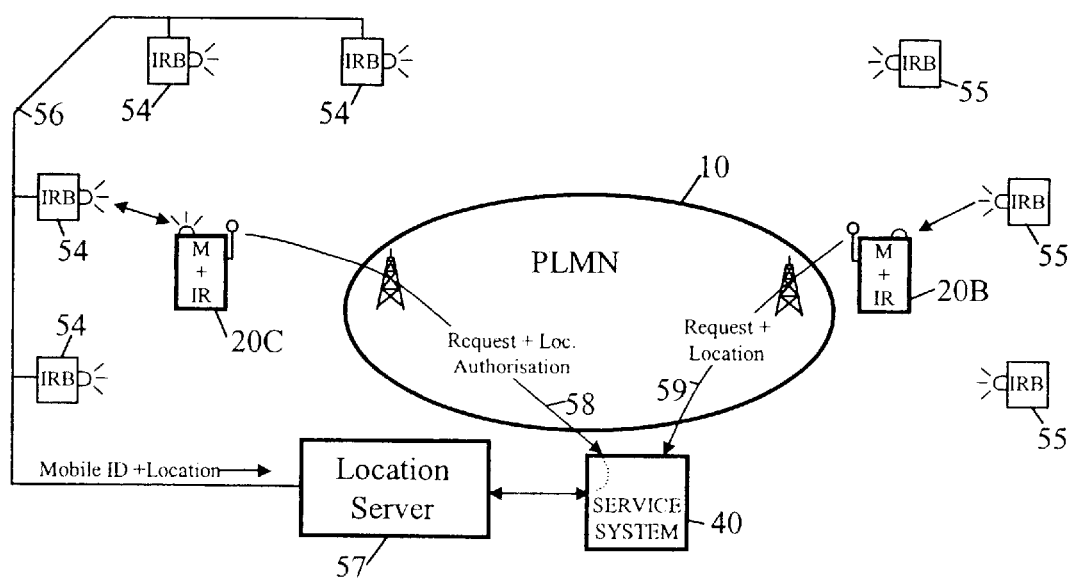
FIG. 3 is a diagram illustrating another known approach to determining the location of a mobile entity, this approach being based on proximity of the mobile entity to fixed-position local beacons.
Figure 4:
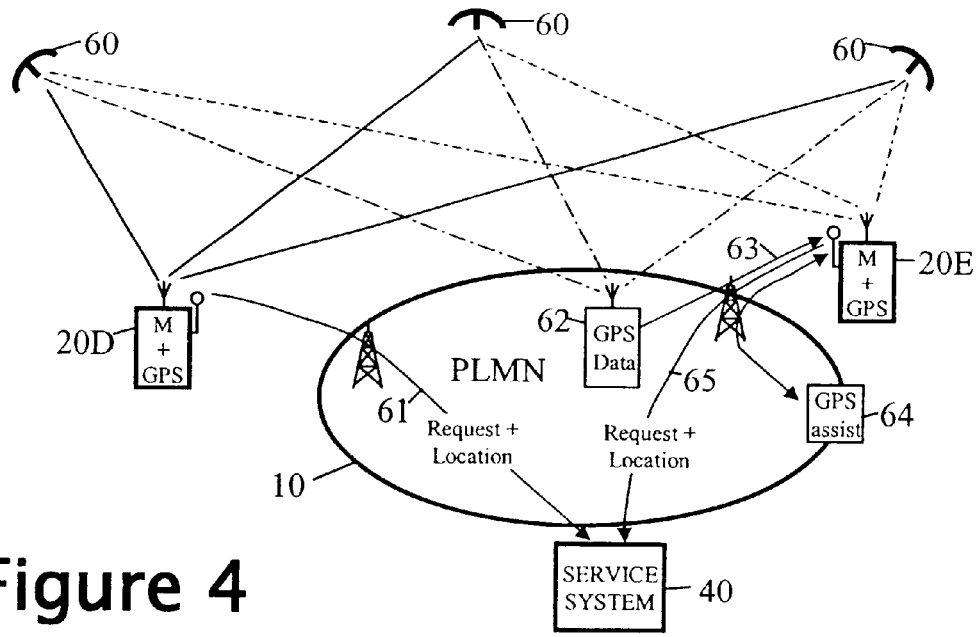
FIG. 4 is a diagram illustrating a further known approach to determining the location of a mobile entity, this approach involving the use of GPS satellites.
Figure 5:
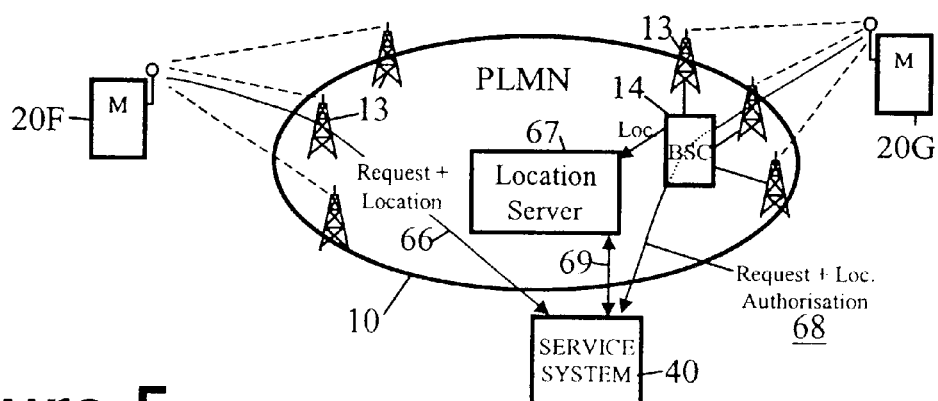
FIG. 5 is a diagram illustrating a still further approach to determining the location of a mobile entity, this approach being based on the use of signals present in a cellular mobile radio communications system.
Figure 6:
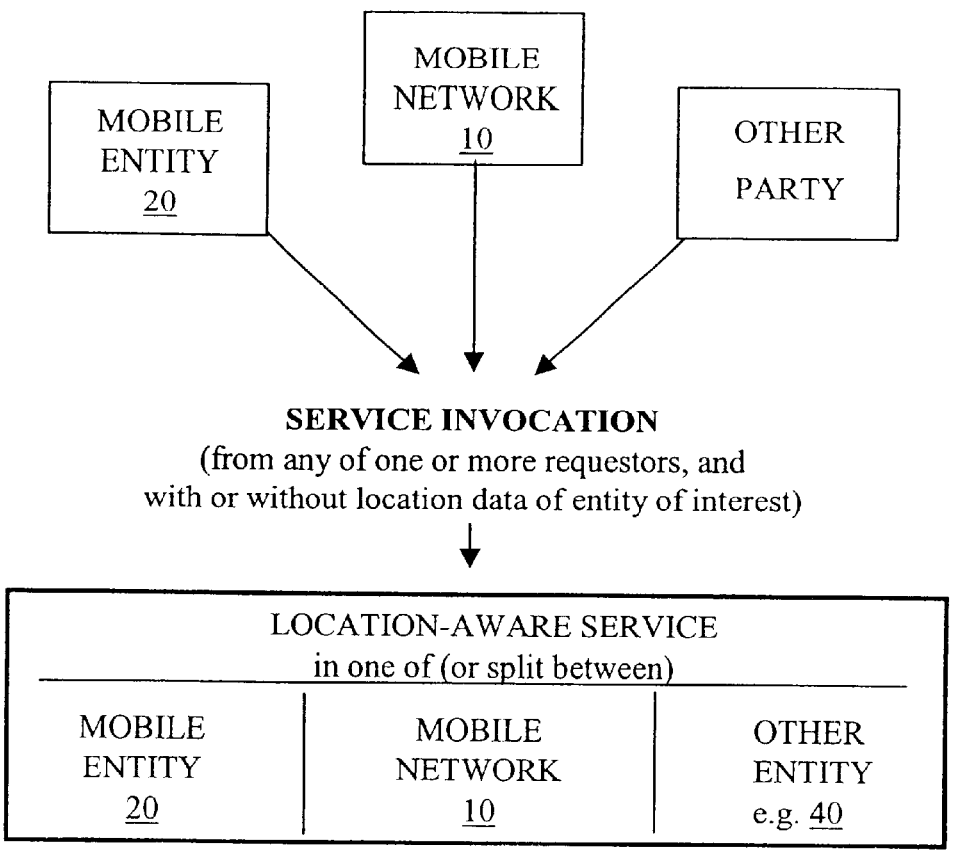
FIG. 6 is a diagram illustrating various different routes by which location information can be provided to a service system.
Figure 6:
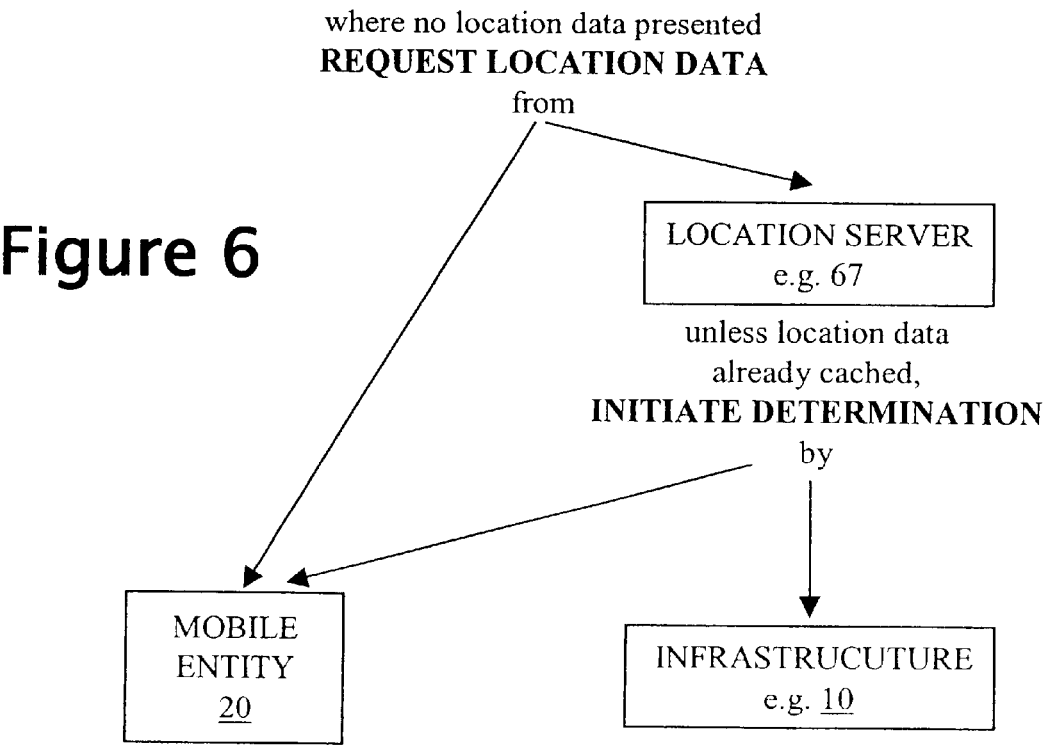
Figure 7:
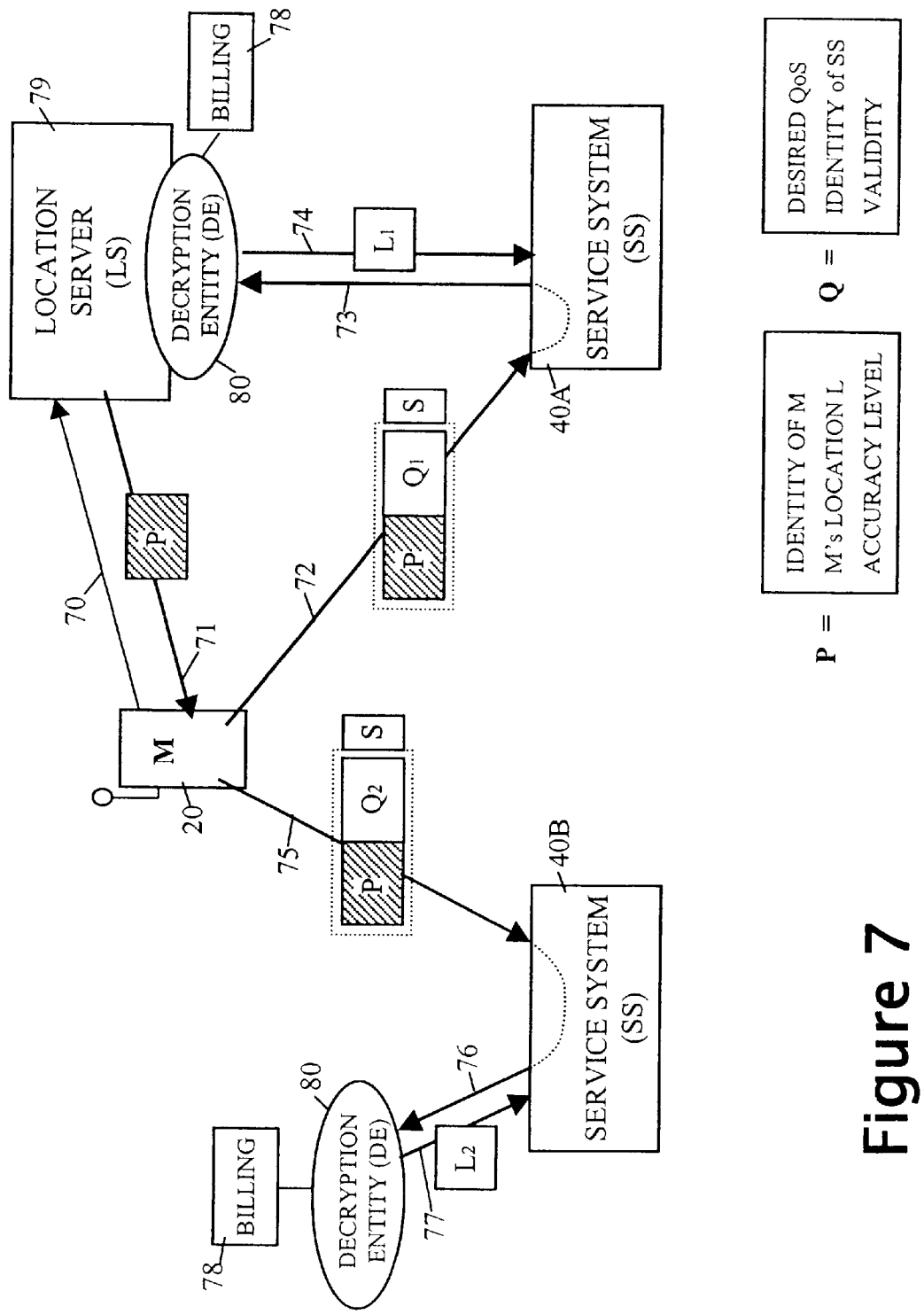
FIG. 7 is a diagram illustrating an embodiment of the invention in which a location server provides encrypted location data to a mobile entity.

FIG. 7 shows a first embodiment of the invention in which location data about a mobile entity 20 is provided by a location server 79 in encrypted form both to assist in keeping it confidential and to protect a billing relationship between participants; in addition, a mechanism is provided by which the user of a mobile entity can limit the accuracy of location data provided to a service system 40. More particularly, upon request (see arrow 70) from mobile entity 20, location server 79 returns (arrow 71) the location L of the mobile entity in an encrypted package P (shown hatched to represent its encrypted form). Package P also contains an identifier for the mobile entity (for example, the public key of a public/private asymmetric key pair associated with the mobile entity), and an indicator of the accuracy of the location data provided).

The package P is encrypted such that it can only be decrypted using a secret known to a decryption entity 80 associated with the location server 79 (in FIG. 7, two decryption entities 80 are shown, a first one co-located with the location server, and a second one separately located). The secret is, for example, the private key of a public/private key pair, the public key being used to encrypt the package P whilst the private key is kept secret to the decryption entities; alternatively, the secret could by a symmetric key known both to the location server and the decryption entities and used both for encryption and decryption. Whatever the form of the decryption secret, in the present embodiment it is intended to be unknown to the mobile entity 20 and the service system 40.

The mobile entity 20 now supplies (arrow 72) the encrypted location data to a first service system 40A with a request for a first location-aware service; because of privacy concerns, the user of the mobile entity does not want the service system to know his/her location with a high degree of accuracy and accordingly specifies an accuracy limit as a quality of service parameter in data package $Q_1$. Package $Q_1$ also includes the identity of the service system 40A and the period of validity of the request (for example, 10 minutes). Packages P and $Q_1$ are together digitally signed by mobile entity 20 using the private key of the user (the digital signature S is shown in FIG. 7 as enclosing the packages P and $Q_1$ within a dotted box). As a result, the encrypted location data and the parameters contained in package $Q_1$ cannot be altered or substituted without this being detectable.

Before the service system 40A can act upon the request from mobile entity 20, it must have the location data L decrypted by decryption entity 80; the decryption entity is such that it will not decrypt the location data unless also provided with package $Q_1$ protected by digital signature S—this is done so that the decryption entity can reliably limit the accuracy of the location data it returns to the level specified by the mobile entity. Accordingly, service system 40A next passes the digitally-signed packages P and $Q_1$ (arrow 73) to the entity 80; for security reasons, the connection between the service system 40A and decryption entity 80 is preferably an encrypted connection with authentication of the participating parties (for example, an SSL or TLS connection).

Figure 8:
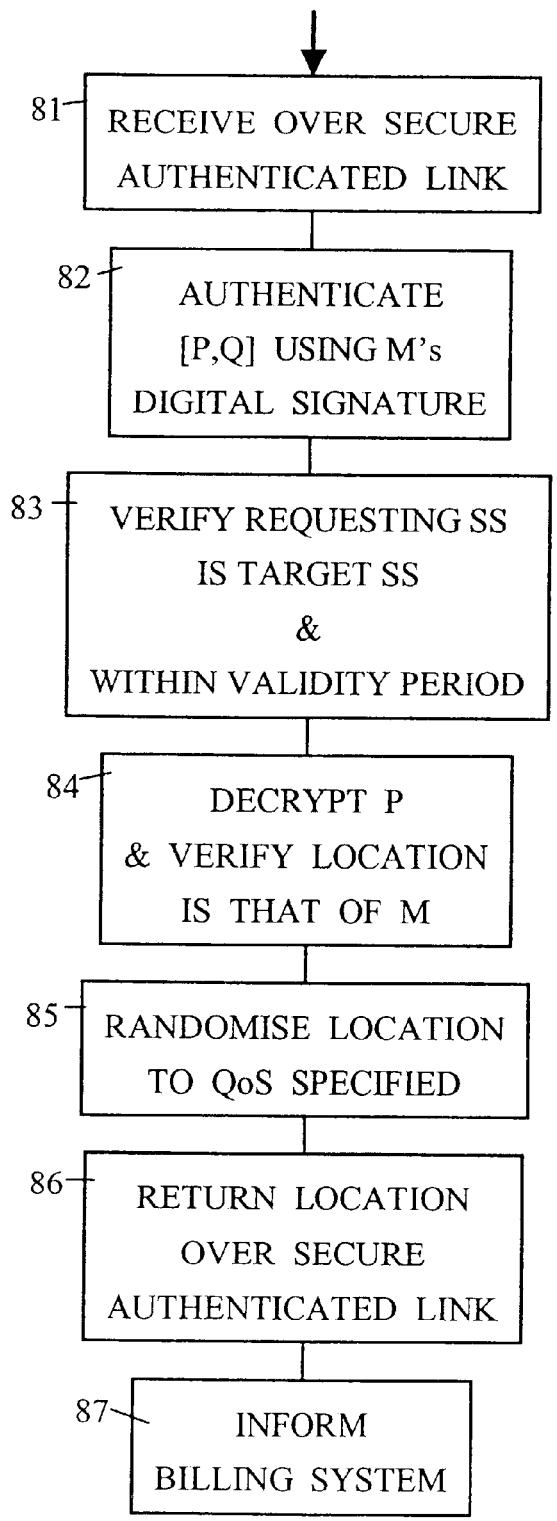
FIG. 8 is a diagram illustrating a decryption process carried out by a decryption entity of the FIG. 7 embodiment.

Decryption entity 80 now proceeds to execute the steps shown in FIG. 8:

Step 81—digitally-signed packages P and $Q_1$ are received from service system 40A over the secure authenticated link.

Step 82—the authenticity of the data contained in packages P and $Q_1$ is checked by using the digital signature S and the public key of mobile entity 20 in conventional manner—if authentication is not achieved, the decryption process is aborted and an error message returned to system 40A.

Step 83—the identity of the service system 40A as provided during the set up of the secure link between system 40A and entity 80 is checked against the service-system identity contained in the authenticate package $Q_1$—if there is a mismatch the decryption process is aborted and an error message returned to system 40A. A check is also made that the decryption request from the system 40A has been received within the validity time window specified in package $Q_1$—if the request was received outside the period of validity, the decryption process is aborted and an error message returned to system 40A.

Step 84—The package P is decrypted and a check made that the location data L it contains relates to the same mobile entity as signed the package $Q_1$—if there is a mismatch in identity, the decryption process is aborted and an error message returned to system 40A

Step 85—The accuracy of the decrypted location data L is next compared with the specified accuracy limit contained in package $Q_1$. If the specified accuracy limit is tighter than the accuracy of the available location data, no action is required to obscure the location data. However, if the accuracy of the available location data is higher that the specified accuracy limit, then the location data L is modified to make it less reliable. More particularly, the accuracy of the location data is decreased by combining with its components, additional components randomised over a range set by the difference between the known accuracy of the available location data and the specified accuracy level; for example, if the location data is in the form of X, Y coordinates, then the aforesaid components are X and Y coordinate components of the mobile entity's location.

Step 86—The decrypted location data $L_1$ with accuracy limited to the level specified by the QoS parameter set by the mobile entity is then returned to the service system 40A over the secure link (arrow 74 in FIG. 7).

Step 87—Finally, the decryption entity 80 generates a billing record and passes it to billing system 78.

The service system 40A now uses the location data $L_1$ to provide the location-aware service requested by mobile entity 20.

The mobile entity 20 also uses the encrypted location data in package P to request (arrow 75) a second location aware service from a second service system 40A, this time with a higher accuracy limit specified in package $Q_2$. As with service system 40A, service system passes the digitally signed packages P and $Q_2$ to a decryption entity 80 (arrow 76) and receives back (arrow 77) the location data $L_2$ to the specified accuracy level; decryption entity 80 generates a billing record which it passes to billing system 78. The service system 40B then uses the location data $L_2$ to provide the requested location aware service.

The foregoing arrangement not only enables the mobile user to specify the limit of accuracy with which the service system can know the location of the mobile user, but also enables a billing relationship for location data to be established between the service systems 40 and the decryption entities 80. The mobile user is not directly charged for the location data and the service system operators can compete on the cost of the location data, for example, by doing special deals with the decryption entities. It maybe expected that the billing of the location data will depend on the accuracy level set; to enable service system operators to compete on service level and price, it can be arranged that the service system can also specify an accuracy limit and the decryption entity will then comply with the lowest specified limit—a service system can then seek to provide a satisfactory service at a lower price because it is using less accurate data than a competitor.

It may be noted that the arrangement of FIG. 7 permits the mobile entity to make service requests based on historic location data with billing still being done on the basis of actual usage of the location data, without any requirement for the location server to archive location data.

Figure 9:
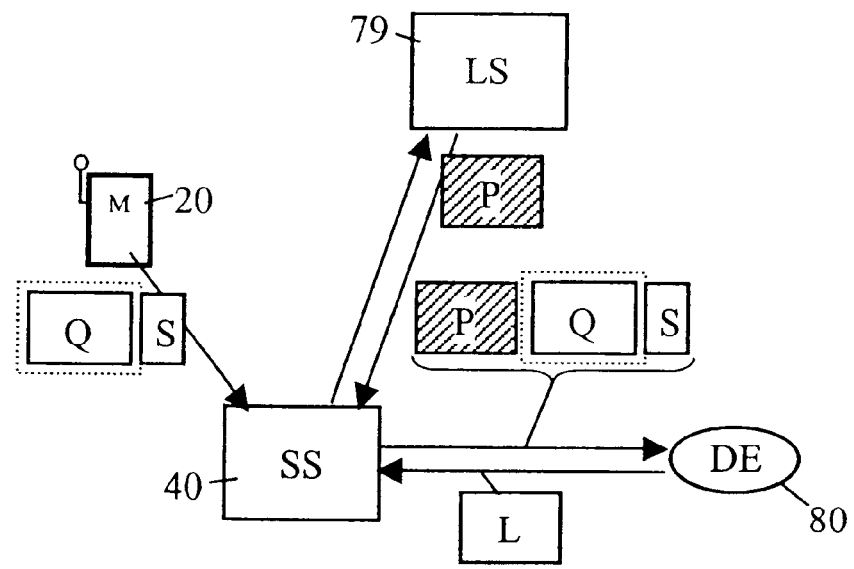
FIG. 9 is a diagram illustrating a further embodiment of the invention in which a location server provides encrypted location data to a service system.

FIG. 9 shows a variant of the FIG. 7 arrangement in which the location server 79 sends the package P, not to the mobile entity 20, but to the service system 40—this being done in response to a request generated by the service system 40 following the receipt of a service request from the mobile entity. Digitally-signed package Q is provided to the service system along with the service request. The system 40, upon receiving the package P, then passes both packages to the decryption entity. Decryption entity 80 operates as described above except that now only the package Q is digitally signed by mobile entity, not packages P and Q together. The provision of package P direct to the service system is secure in that system 40 cannot decrypt the package without the aid of the decryption entity and this latter checks whether the mobile entity has requested a service from the service system 40; however, as an extra precaution, the location server can be arranged to require the service system to pass it package Q which it must authenticate and match with the request details from system 40 before the location server provides package P.

Figure 10:
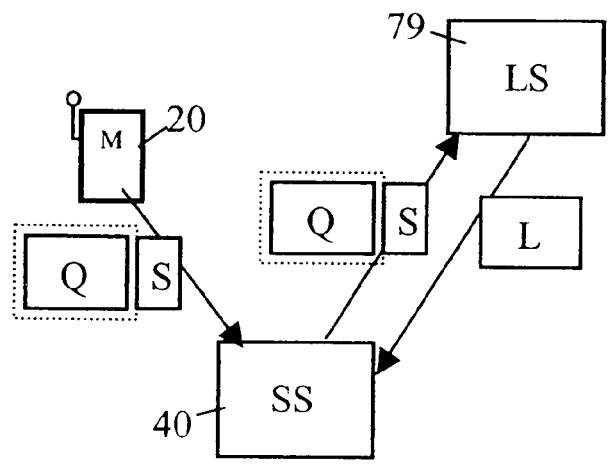
FIG. 10 is a diagram illustrating the provision of accuracy limit data to a location server to limit the accuracy of the location data returned by the server.

In the FIG. 10 embodiment, the digitally-signed package Q provided by the mobile entity 20 with a service request to the service system 40, is again passed by the service system to the location server. However, this time the location server simply provides the location data in unencrypted form but with an accuracy limit as specified in package Q. The checks carried out by the location server 79 on the basis of the digitally-signed package Q are the same as described above as being effected by the decryption entity (steps 82, 83 of FIG. 8).

Figure 11:
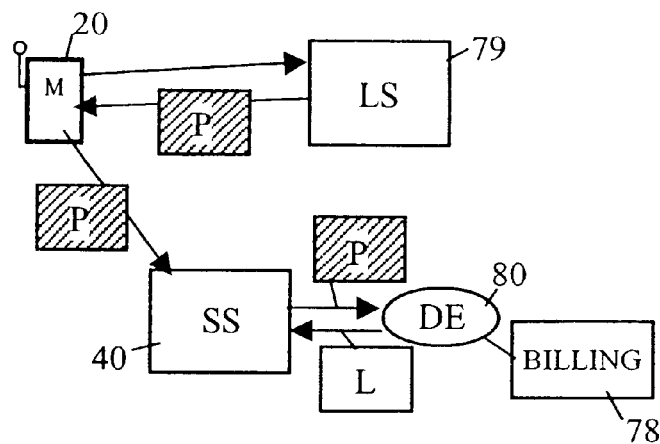
FIG. 11 is a diagram illustrating a further arrangement in which a location server provides encrypted location data to a mobile entity.
Figure 12:
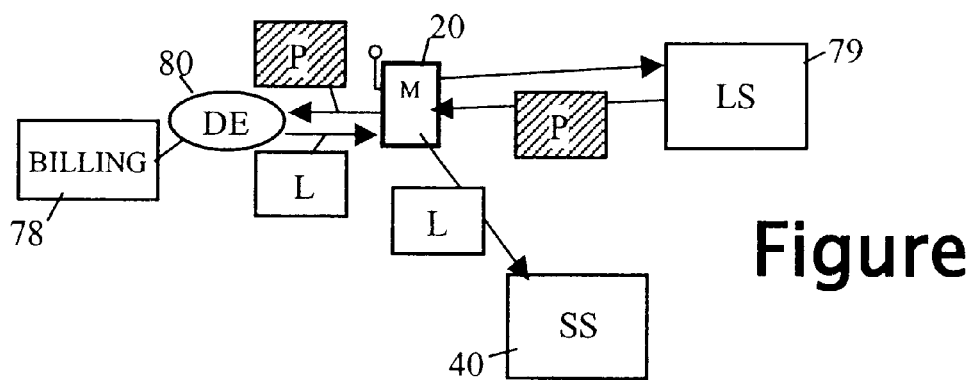
FIG. 12 is a diagram illustrating another arrangement in which a location server provides encrypted location data to a mobile entity.
Figure 13:
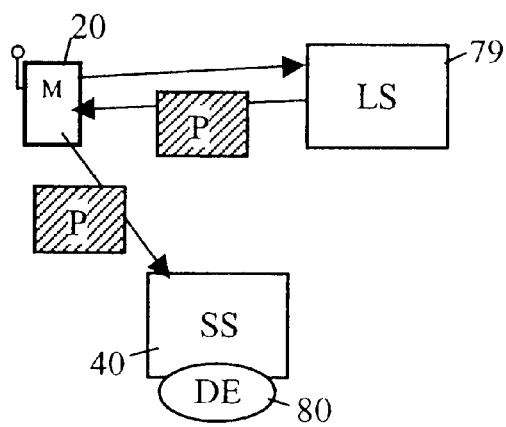
FIG. 13 is a diagram illustrating a still further arrangement in which a location server provides encrypted location data to a mobile entity.

The embodiments of FIGS. 11 to 13 illustrate the advantages to be gained by encrypting the location data provided by the location server to the mobile entity where the latter is not enabled to decrypt the location data. The FIG. 11 arrangement is similar to that of FIG. 7 except that the mechanism for the user to specify an accuracy limit has been omitted. This arrangement nevertheless protects the billing relationship between the participants since the mobile entity cannot use the location information except with the involvement of decryption entity; the location server 79 (which is associated with entity 80) is thus remunerated by the service system whenever the location data is used.

In the FIG. 12 arrangement, it is the mobile entity that requests the decryption entity to decrypt the package P and provide back the location data to the mobile entity; the mobile entity then provides the decrypted location data to the service system. In this case, it is the mobile entity that is billed for the decryption of the location data. Although the package P is illustrated as being provided by the location server in response to a request from the mobile entity, package P could be pushed by the location server on a no-charge basis—the mobile entity only incurring a charge if the location data is decrypted for use.

In the FIG. 13 arrangement, the decryption entity 80 is associated with the service system rather than with the location server; the location server still encrypts package P such that the decryption entity can decrypt it (thus, the package P can be encrypted using the public key of the service system, the decryption entity then using the private key of the system 40 to decrypt the package P). Thus, the operator of the service system may have contracted with the operator of the location server 79 that the latter will provide encrypted location data to mobile users—this data is, however, only of use in relation to services offered by the particular service system 40 concerned.

Figure 14:
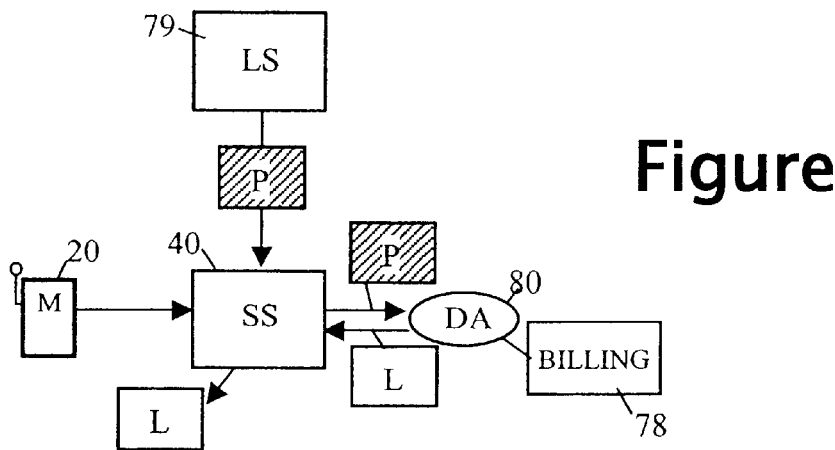
FIG. 14 is a diagram illustrating a further arrangement in which a location server provides encrypted location data to a service system.
Figure 15:
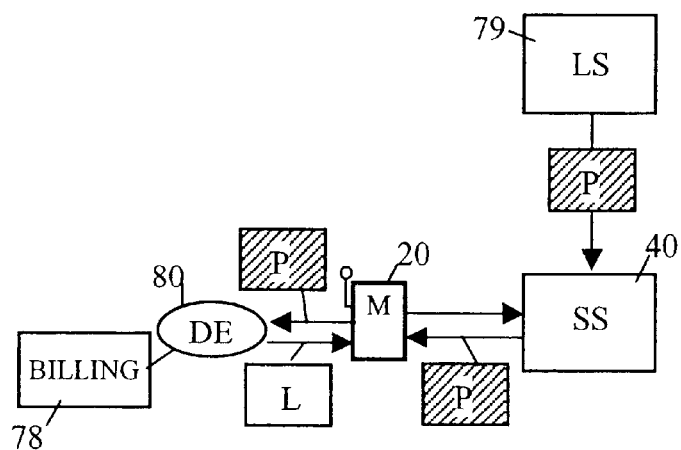
FIG. 15 is a diagram illustrating another arrangement in which a location server provides encrypted location data to a service system.
Figure 16:
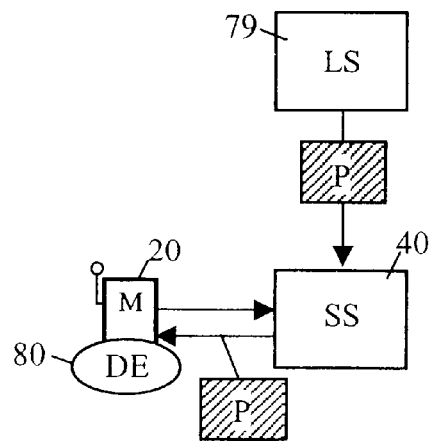
FIG. 16 is a diagram illustrating a still further arrangement in which a location server provides encrypted location data to a service system.

The embodiments of FIGS. 14 to 16 illustrate the advantages to be gained by encrypting the location data provided by the location server 79 to the service system 40 where the latter is not enabled to decrypt the location data. These advantages include protecting the confidentiality of the location data, particularly where the service system is a location archival or escrow system.

The FIG. 14 arrangement is similar to that of FIG. 9 except that the mechanism for the user to specify an accuracy limit has been omitted. This arrangement nevertheless protects the billing relationship between the participants since the service system cannot use the location data except with the involvement of decryption entity 80; the location server 79 (which is associated with entity 80) is thus remunerated by the service system whenever the location data is used. One application of the FIG. 14 arrangement is as a location archive or escrow for location data on the mobile entity—location data is periodically pushed by the location server to the archive/escrow system 40 and can subsequently be accessed to check historic location. Preferably, the decryption agent is operative only to decrypt the location data with appropriate authorisation from the user of the mobile entity.

In the FIG. 15 arrangement, it is the mobile entity that contacts the decryption entity to have the package P decrypted; in the illustrated example, the location data is initially pushed to the service system (again, this could be an archive/escrow system) and then when requested, the location data is passed to the mobile entity.

In the FIG. 16 arrangement, the decryption entity 80 is associated with the mobile entity rather than with the location server 79; the location server still encrypts package P for decryption by the decryption entity (thus, the package P can be encrypted using the public key of the mobile entity the decryption entity then using the private key of the entity 20 to decrypt the package P).

As will be appreciated by persons skilled in the art, many variants are possible to the above described arrangements; in particular, the billing arrangements described are merely illustrative and, indeed, can in appropriate circumstances be omitted altogether. Furthermore, the auxiliary data provided with the location data in package P and with the desired accuracy limit in package Y can be omitted in appropriate cases.

What is claimed is:

1. A method of obscuring the location of a mobile entity to a specified accuracy level, wherein available location data having a known accuracy greater than said specified accuracy has its accuracy decreased by combining with the components of the available location data, additional components randomised over a range set by the difference between the known accuracy of the available location data and the specified accuracy level.

2. A method according to claim 1, wherein the specified accuracy level is selectively set by the mobile entity.

3. A method according to claim 1, wherein said components are X and Y coordinate components of the mobile entity's location.

4. A method according to claim 1, wherein said available location data is provided by a GPS receiver system.

5. A method according to claim 1, wherein said available location data is provided by a cellular radio network.

6. A mobile device comprising a processing subsystem for carrying out processing tasks, a location-discovery subsystem for obtaining the location of the device to known accuracy, and communication subsystem for sending the location of the device to a remote entity; the processing subsystem being operative to control the sending out of the device location at a desired accuracy level less than said known accuracy for which purpose the processing subsystem is provided with accuracy-reduction means for combining with components of the device's location as provided by the location-discovery subsystem, additional components randomised over a range set by the difference between the known accuracy of the location provided by the location-discovery subsystem data, and said desired accuracy level.

7. A mobile device according to claim 6, wherein the desired accuracy level is selectively specified at the mobile device.

8. A mobile device according to claim 6, wherein said components are X and Y coordinate components of the mobile device's location.

9. A mobile device according to claim 6, wherein said location-discovery subsystem is a GPS receiver system.

10. A mobile device according to claim 6, wherein said location-discovery subsystem interacts with a cellular radio network infrastructure to derive the device location.

* * * * *